United States Patent
Zhao

(10) Patent No.: US 12,430,643 B2
(45) Date of Patent: Sep. 30, 2025

(54) DATA MANAGEMENT METHOD, APPARATUS AND SYSTEM BASED ON BLOCKCHAIN

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Junjie Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 322 days.

(21) Appl. No.: 18/017,937

(22) PCT Filed: Jul. 26, 2021

(86) PCT No.: PCT/CN2021/108427
§ 371 (c)(1),
(2) Date: Jan. 25, 2023

(87) PCT Pub. No.: WO2022/022457
PCT Pub. Date: Feb. 3, 2022

(65) Prior Publication Data
US 2023/0274271 A1    Aug. 31, 2023

(30) Foreign Application Priority Data
Jul. 31, 2020    (CN) .......................... 202010760397.X

(51) Int. Cl.
*G06F 16/00* (2019.01)
*G06F 16/182* (2019.01)
(Continued)

(52) U.S. Cl.
CPC ....... *G06Q 20/389* (2013.01); *G06F 16/1824* (2019.01); *G06F 16/2365* (2019.01);
(Continued)

(58) Field of Classification Search
CPC .. G06Q 20/389; G06Q 20/401; G06Q 20/065; G06Q 20/0658; G06Q 20/3674;
(Continued)

(56) References Cited

U.S. PATENT DOCUMENTS 10,708,068 B2    7/2020  Cheng et al.
11,138,608 B2 *  10/2021 Green ................... H04L 9/0643
(Continued)

FOREIGN PATENT DOCUMENTS

CN    101166190 A    4/2008
CN    106790431 A    5/2017
(Continued)

OTHER PUBLICATIONS

Gero Dittmann et al., "A Blockchain Proxy for Lightweight IoT Devices", 2019 Crypto Valley Conference on Blockchain Technology (CVCBT) (Jun. 2019, pp. 82-85).*
(Continued)

*Primary Examiner* — Srirama Channavajjala
(74) *Attorney, Agent, or Firm* — Dilworth & Barrese, LLP.; Michael J. Musella, Esq.

(57) ABSTRACT

A data management method, device and system based on blockchain. The data management method based on a blockchain is applied to a verification node. The method includes: acquiring transaction data including N pieces of digest data that are respectively generated on the basis of N pieces of data associated with the transaction data, and N is an integer greater than 1; selecting, from the N pieces of digest data, M pieces of digest data to be used for verification, M is an integer less than or equal to N and greater than or equal to
(Continued)

1; acquiring M pieces of storage data respectively corresponding to the M pieces of digest data; calculating respective digests of the M pieces of storage data, and when the M pieces of digest data are identical to the respective digests of the M pieces of storage data, respectively, writing the transaction data into a blockchain.

14 Claims, 11 Drawing Sheets

(51) Int. Cl.
    *G06F 16/23*     (2019.01)
    *G06F 16/27*     (2019.01)
    *G06N 5/04*     (2023.01)
    *G06Q 20/00*     (2012.01)
    *G06Q 20/06*     (2012.01)
    *G06Q 20/38*     (2012.01)
    *G06Q 20/40*     (2012.01)
    *G16Y 10/25*     (2020.01)
    *G16Y 40/60*     (2020.01)

(52) U.S. Cl.
    CPC ............... *G06F 16/27* (2019.01); *G06N 5/04* (2013.01); *G06Q 20/065* (2013.01); *G06Q 20/0658* (2013.01); *G06Q 20/401* (2013.01); *G16Y 10/25* (2020.01); *G16Y 40/60* (2020.01)

(58) Field of Classification Search
    CPC ............ G06Q 20/3825; G06Q 20/4041; G06F 16/1824; G06F 16/2365; G06F 16/27; H04L 9/0637; H04L 9/30; H04L 9/3247; H04L 9/50; H04L 9/3297; G06N 20/00; G06N 20/10; G06N 3/0445; G06N 5/04
    See application file for complete search history.

(56) References Cited

U.S. PATENT DOCUMENTS

| | | | | |
|---|---|---|---|---|
| 11,853,922 | B2* | 12/2023 | Kochura | ................ G06Q 10/10 |
| 2014/0115131 | A1* | 4/2014 | Zhu | .................... H04L 41/0813 |
| | | | | 709/221 |
| 2016/0125040 | A1* | 5/2016 | Kheterpal | .............. G06Q 20/06 |
| | | | | 707/776 |
| 2018/0330349 | A1* | 11/2018 | Uhr | ....................... G06Q 20/367 |
| 2018/0349706 | A1 | 12/2018 | Hodgson et al. | |
| 2019/0014176 | A1* | 1/2019 | Tormasov | ............. H04L 63/123 |
| 2019/0171838 | A1 | 6/2019 | Struttmann | |
| 2019/0287027 | A1 | 9/2019 | Franceschini et al. | |
| 2019/0339678 | A1* | 11/2019 | Biernat | ................... H04L 63/12 |
| 2019/0386817 | A1 | 12/2019 | Carson et al. | |
| 2020/0027096 | A1* | 1/2020 | Cooner | .................. G06Q 40/04 |
| 2020/0143490 | A1* | 5/2020 | Lucidarme | ........... G06Q 20/389 |
| 2020/0301944 | A1* | 9/2020 | Lee | ............................ H04L 9/50 |
| 2021/0042421 | A1* | 2/2021 | Li | .............................. H04L 9/50 |
| 2021/0143998 | A1* | 5/2021 | Kuai | ..................... H04L 9/3247 |

FOREIGN PATENT DOCUMENTS

| | | | | |
|---|---|---|---|---|
| CN | 109871709 | A | | 6/2019 |
| CN | 110275891 | A | | 9/2019 |
| CN | 110289060 | A | | 9/2019 |
| CN | 110443608 | A | | 11/2019 |
| CN | 110738482 | A | | 1/2020 |
| CN | 110930152 | A | | 3/2020 |
| GB | 2582270 | A | * | 3/2019 |
| WO | WO 2019072823 | A1 | * | 4/2019 |
| WO | WO 2019228549 | A2 | * | 12/2019 |

OTHER PUBLICATIONS

Anusha Vangala et al., "Smart Secure Sensing for IoT-Based Agriculture Blockchain Perspective", IEEE Sensors Journal ( vol. 21, Issue: 16, Jul. 27, 2020), pp. 17591-17607.*

Extended European Search Report from Application No. 21849628.9 mailed Oct. 24, 2024.

International Search Report (ISR) of the international application PCT/CN2021/108427 Mailed Sep. 24, 2021.

* cited by examiner

US 12,430,643 B2

DATA MANAGEMENT METHOD, APPARATUS AND SYSTEM BASED ON BLOCKCHAIN

This application is a U.S. National Phase Entry of International Application No. PCT/CN2021/108427 filed on Jul. 26, 2021, designating the United States of America and claiming priority to Chinese Patent Application No. 202010760397.X, filed on Jul. 31, 2020. The present application claims priority to and the benefit of the above-identified applications and the above-identified applications are incorporated by reference herein in their entirety.

TECHNICAL FIELD

The present disclosure relates to a technical field of data management, and in particular, to a blockchain-based data management method, apparatus and system.

BACKGROUND

With the development of the Internet of Things (IoT), more and more devices are connected to the IoT system. A current general IoT system framework is shown in FIG. 1, in which IoT devices with limited capabilities, such as sensors, are connected to the IoT platform through the IoT gateway. Full-function IoT devices may connect to the IoT platform directly or through the IoT gateway. The IoT platform centrally manages various devices, and provides interfaces for upper-layer IoT applications. IoT applications access the device data and control the device through the IoT platform.

Taking intelligent manufacturing, one of the application fields of the IoT, as an example, a large number of industrial devices are connected to an industrial Internet platform directly or through the IoT gateway, reporting data in real time and receiving instructions sent by the platform. The manufacturing industry is a typical heavy-asset enterprise, which needs to purchase a large number of devices, and requires higher capital for the enterprise.

With the development of the intelligent manufacturing, the development mode of an enterprise will also change in the future. Manufacturers don't need to purchase a large number of devices; instead, they can be quickly put into production through a model of renting device, and pay a usage fee according to the usage of the device. On the one hand, this rental and leasing mode can reduce the up-front investment of the enterprise in device, allowing the enterprise to be put into production quickly, and on the other hand, it may lower the device maintenance costs for the enterprise.

In this way, a shared device platform is established, on which the surplus foundry capacity or production lines (production devices) of some enterprises can be "shared online". After being selected by the enterprises with demand, the production of the order can be realized online, thereby solving the problems of overcapacity and idle devices in some foundry enterprises, as well as insufficient production capacity and backlogs of some other foundry enterprises. It is of great significance to promote resource optimization and industrial upgrading of manufacturing enterprises (manufacturers).

SUMMARY

According to an aspect of the present disclosure, a blockchain-based data management method, which is applied to a verification node, is provided. The method comprises: acquiring transaction data, wherein the transaction data comprises N pieces of digest data, the N pieces of digest data are respectively generated on the basis of N pieces of data associated with the transaction data, and N is an integer greater than 1; selecting M pieces of digest data to be used for verification from the N pieces of digest data, wherein M is an integer which is less than or equal to N and greater than or equal to 1; acquiring M pieces of storage data respectively corresponding to the M pieces of digest data; calculating respective digests of the M pieces of storage data; and when the M pieces of digest data are identical to the respective digests of the M pieces of storage data, respectively, writing the transaction data into the blockchain.

According to another aspect of the present disclosure, a blockchain-based data management method, which is applied to a plurality of verification nodes, is provided. The method comprises: acquiring transaction data, wherein the transaction data comprises N pieces of digest data, and the N pieces of digest data are respectively generated on the basis of N pieces of data associated with the transaction data, and N is an integer greater than 1; selecting M pieces of digest data to be used for verification from the N pieces of digest data, wherein M is an integer which is less than or equal to N and greater than or equal to 1, wherein the digest data verified by a first type of verification node in the plurality of verification nodes comprises digest data generated on the basis of a piece of data with a shortest length in the M pieces of data that generate the M pieces of digest data; acquiring M pieces of storage data respectively corresponding to the M pieces of digest data; calculating respective digests of the M pieces of storage data; and when the M pieces of digest data are identical to the respective digests of the M pieces of storage data, respectively, writing the transaction data into the blockchain.

According to another aspect of the present disclosure, a blockchain-based data management method, which is applied to a usage node, is provided. The method comprises: acquiring M pieces of digest data from N pieces of digest data included in transaction data corresponding to a specific device and/or a time period, wherein the N pieces of digest data are respectively generated on the basis of N pieces of data associated with the transaction data, and N is an integer greater than 1 and M is an integer which is less than or equal to N and greater than or equal to 1; acquiring M pieces of storage data respectively corresponding to the M pieces of digest data; calculating respective digests of the M pieces of storage data; and when the M pieces of digest data are identical to the respective digests of the M pieces of storage data, respectively, determining complete data associated with the transaction data is not tampered with.

According to another aspect of the present disclosure, a blockchain-based data management method, which is applied to an intermediate device, is provided. The method comprises: acquiring complete data of at least one sensor device; dividing the complete data of the at least one sensor device into P pieces of data, and generating complete digest data on the basis of the complete data of the at least one sensor device and/or generating P pieces of digest data on the basis of the P pieces of data respectively, and P is an integer greater than 1; storing the P pieces of data and/or the complete data in a data server node; and including P pieces of digest data and/or N pieces of digest data of the complete digest data in transaction data and sending the transaction data to a verification node of the blockchain, and N is equal to P or P+1, wherein the verification node in the blockchain generates a block of the transaction data and writes the block into the blockchain when M pieces of digest data in the N pieces of digest data calculated by the intermediate device are identical to respective digests of M pieces of storage data corresponding to the M pieces of digest data calculated by the verification node, wherein M is an integer less than N and greater than or equal to 1.

According to a still aspect of the present disclosure, a blockchain-based data management apparatus is provided. The blockchain-based data management apparatus comprises: a processor, and a memory, with instructions stored thereon, wherein when the instruction being executed, the processor is caused to perform the above-mentioned methods.

According to a still aspect of the present disclosure, a blockchain-based data management system is provided. The blockchain-based data management system comprises: at least one sensor device, configured to generate complete data; a blockchain network; and an intermediate device, configured to execute the above-mentioned methods preformed at the an intermediate device. The blockchain network comprises: a data server node, configured to store complete data and/or P pieces of data divided from the complete data; a storage node, configured to store complete digest data generated on the basis of the complete data and/or at least one piece of digest data generated on the basis of at least one piece of the P pieces of data divided from the complete data; a verification node, configured to execute the above-mentioned methods preformed at the verification node; a usage node, configured to execute the above-mentioned methods preformed at the usage node.

BRIEF DESCRIPTION OF THE DRAWINGS

In order to explain the principles of the present disclosure, embodiments of the present disclosure will be described with reference to the accompanying drawings. It should be understood that the elements shown in the figures may be implemented in various forms of hardware, software or their combinations. Optionally, these elements are implemented in a combination of hardware and software on one or more suitably programmed general-purpose computer device.

DETAILED DESCRIPTION

Figure 1:
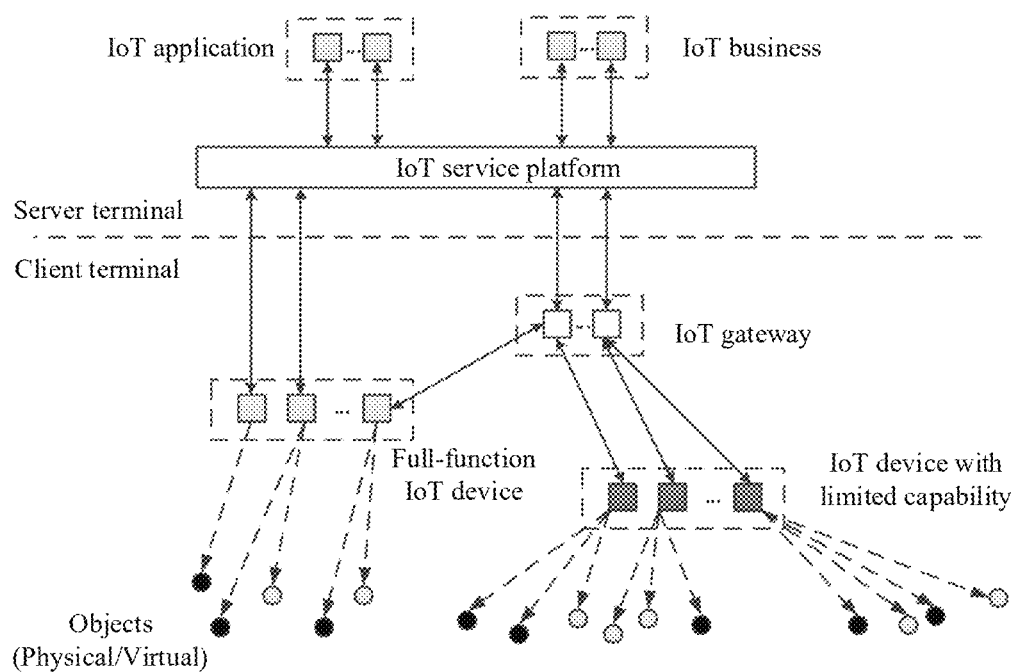
FIG. 1 shows a framework of an Internet of Things system.

Embodiments of the present disclosure will be fully described below with reference to the accompanying drawings, in which embodiments of the present disclosure are shown. However, the present disclosure can be implemented in many different forms, and it should not be construed as limited to the embodiments set forth herein. Throughout, like reference numerals are used to denote like elements.

The terminology used here is only for the purpose of describing specific embodiments, and is not intended to limit the present disclosure. As used herein, singular forms of "a" and "this" are intended to also include plural forms, unless the context clearly indicates otherwise. It should also be understood that when used herein, the term "comprising" specifies the presence of stated features, integers, steps, operations, elements and/or components, but does not exclude the presence or addition of one or more other features, integers, steps, operations, elements, components and/or groups thereof.

Unless otherwise defined, the terms (including technical terms and scientific terms) used herein have the same meanings as commonly understood by those of ordinary skill in the art to which the present disclosure belongs. Terms used here should be interpreted as having the same meanings as those in the context of this specification and related fields, but not in idealized or overly formal meanings, unless specifically defined here.

The present disclosure is described below with reference to block diagrams and/or flowcharts showing methods, apparatuses (systems) and/or computer program products according to embodiments of the present disclosure. It should be understood that one block of the block diagrams and/or flowchart illustrations and combinations of blocks can be implemented by computer program instructions. These computer program instructions may be provided to a processor of a general-purpose computing device or a special-purpose computing device, and/or other programmable data processing apparatuses, so that the instructions executed via the computing device processor and/or other programmable data processing apparatuses create methods for implementing the functions/acts specified in the block diagrams and/or flowchart blocks.

Accordingly, the present disclosure can also be implemented by hardware and/or software (including firmware, resident software, microcode, etc.). Further, the present disclosure may take the form of a computer program product on a computer-usable or computer-readable storage medium, which has computer-usable or computer-readable program code embodied in the medium for use by or in connection with an instruction execution system. In the context of this disclosure, a computer-usable or computer-readable medium can be any medium that can contain, store, communicate, transmit, or transport a program for use by or in connection with an instruction execution system, apparatus, or device.

Figure 2:
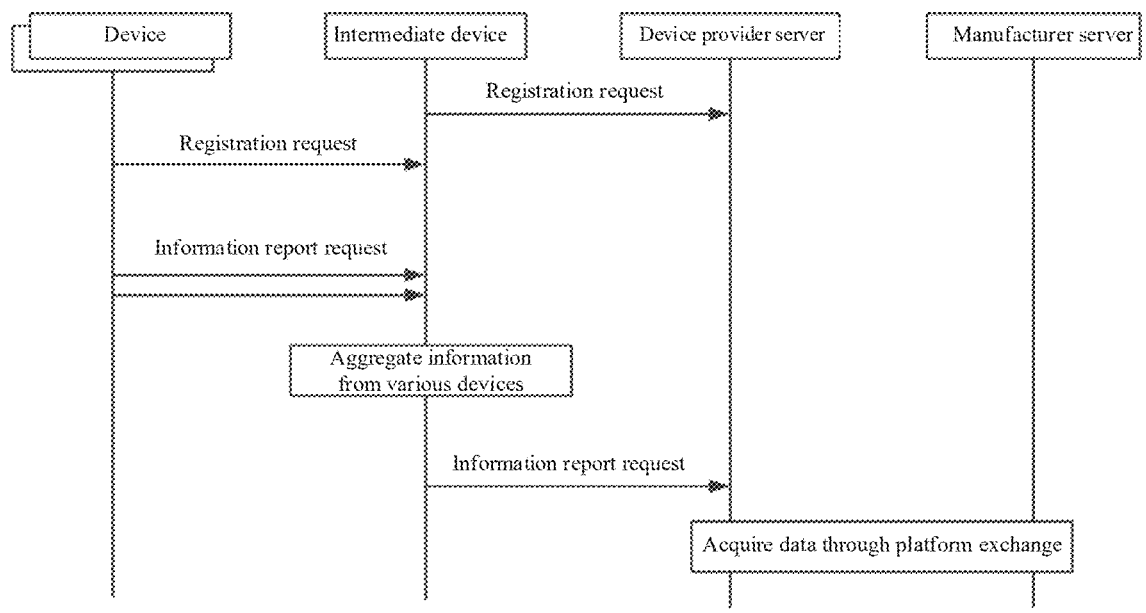
FIG. 2 shows an interaction process among various entities in an intelligent manufacturing application.

As mentioned above, a cooperative relationship is existed between parties (for example, a device provider and a manufacturer) involved in device sharing. The device provider charges the manufacturer who uses his device based on the usage of the device, such factors as usage rate, amount of use, time of use, etc. In order to accurately calculate the usage of the device, the device provider is responsible for collecting data related to the usage of the device, and calculating the usage of the device in order to charge the manufacturer. A specific interaction process is shown in FIG. 2. A device provider server acquires the data uploaded by a device and calculates the usage of the device. The manufacturer server acquires the usage of the device and pays for the data through platform interaction.

Taking intelligent manufacturing as an example, non-business data (including usage data) of a device is collected and calculated by the device provider server, and the manufacturer server pays the fees according to a calculation result of the device provider server. If data on the device provider server is modified, the fees will be different, and the manufacturer server will not be aware of this. In addition, other supply chain enterprises of the manufacturer may also have a need to acquire the device usage data, so that they can stock up in time according to the usage of the device. In order to enhance mutual trust between the device supplier and the manufacturer, as well as other supply chain enterprises, it is necessary to provide a new mechanism to allow the data of device to be accurate and unchangeable, thereby establishing the mutual trust between the partners.

As an emerging distributed data storage technology, blockchain technology has the following advantages:

First, the data has credibility. Different from a traditional distributed database, blockchain introduces the concept of "everyone is doing bookkeeping". Each participant joins the blockchain through, for example, a client application, and has a right to do bookkeeping. Everyone can save the latest book and all the historical records. This highly redundant storage mode of data may improve the information transparency between entities who do not trust each other, realize that the book data cannot be tampered with and leave traces throughout the process, and thus promote multi-party information sharing and collaborative operation. Second, participants are equal. The unified distributed booking technology of the blockchain naturally solves the problem of "business sovereignty", effectively realizes equality of identity, power, responsibility and interest of each participant, and realizes real-time synchronous update of data among all the participants, which makes the cooperation more convenient and faster, and enhances the enthusiasm of the partners.

That is, the blockchain can realize the credibility of business data and the equalization of participants, promote multi-party information sharing and cooperative operation, and realize the real-time synchronous update of data among all the participants, allowing the data to be accurate and unchangeable, thereby establishing the mutual trust among the partners. The participant mentioned herein may be a network node in a blockchain network, such as a server, a computer, a telephone, etc., connected through the network. For different blockchains, the ways of becoming a node will be different.

However, in the current blockchain-based data management method, in terms of storage, each of the storage nodes on the blockchain needs to store a complete historical transaction information, but the storage capacity of a node is limited. Moreover, in a blockchain, when any participant is to write a new data into the blockchain, a verification process will be involved. How to improve the processing speed while saving computing resources is also an urgent problem to be solved.

Based on this, the embodiments of the present disclosure provide a blockchain-based data management method, apparatus, and system to solve the above technical problems. The data management includes various operations on data, including storing data and acquiring data.

It should be noted that, in some embodiments of the present disclosure, applying the blockchain-based data management technology to the intelligent manufacturing industry has been described as an example. However, those skilled in the art will understand that the blockchain-based data management technology provided by embodiments of the present disclosure may be applied to any other data sharing scenarios that need to increase mutual trust, and the present disclosure is not limited to this.

Figure 3A:
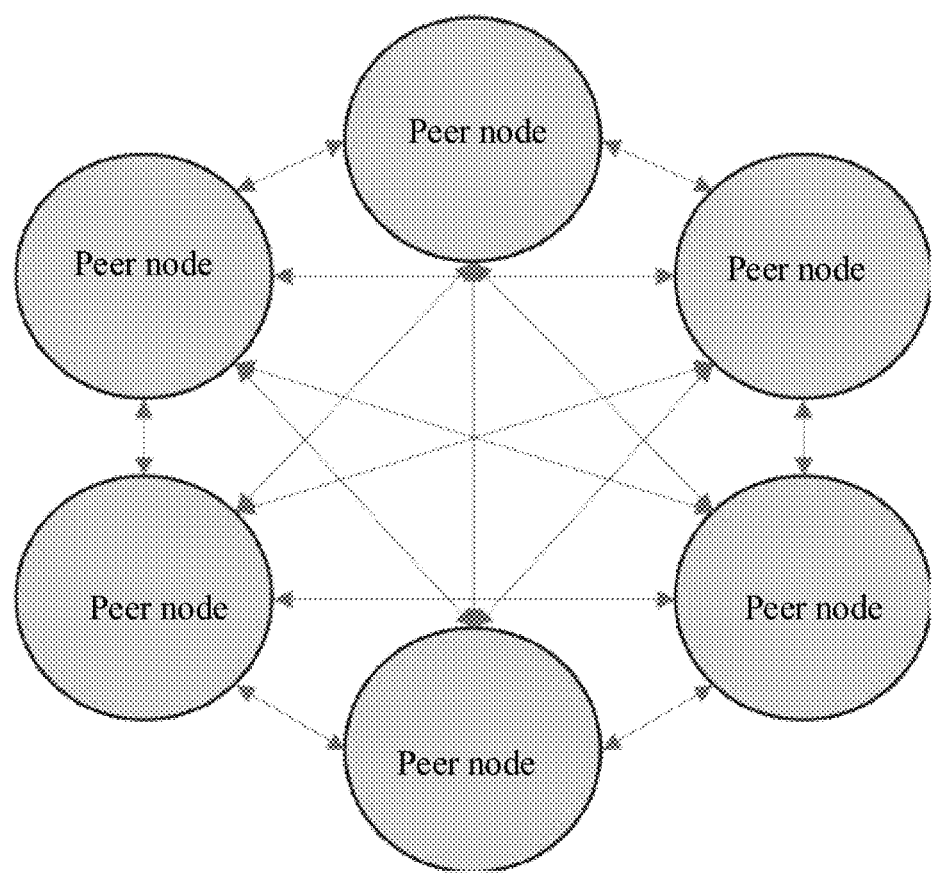
FIGS. 3A-3B show a blockchain network according to an embodiment of the present disclosure.
Figure 3B:
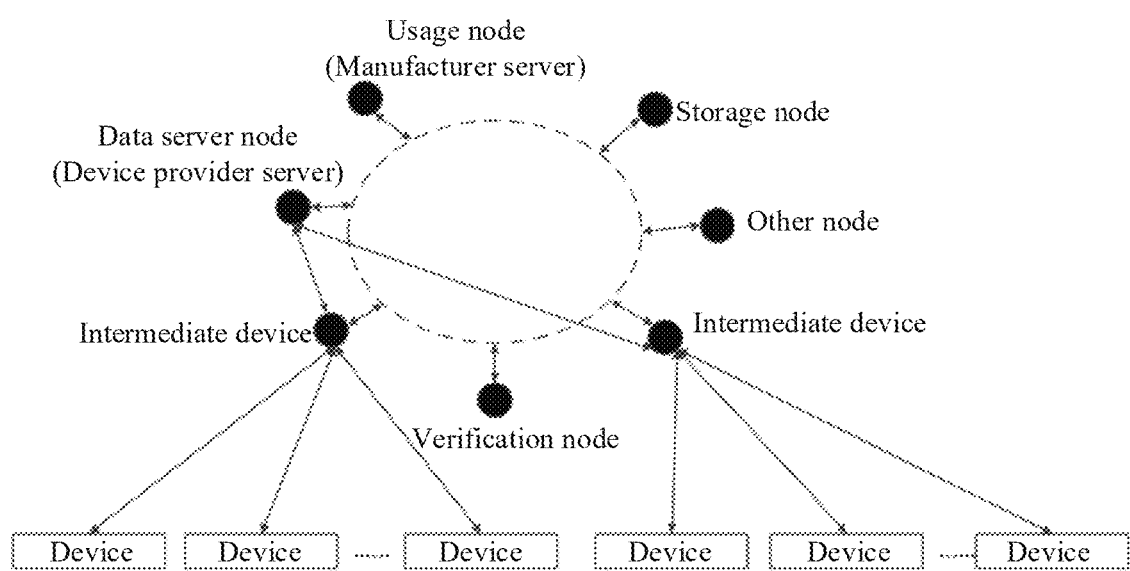

Firstly, a blockchain network related to the embodiments of the present disclosure is introduced. FIGS. 3A-3B illustrate a blockchain network according to embodiments of the present disclosure.

As shown in FIG. 3A, the blockchain network is a decentralized network, which can also be regarded as a P2P (Peer-to-Peer) network. There is no centralized service or hierarchical structure in the blockchain network. Each node based on the consensus mechanism is a peer-to-peer node, and each node jointly provides the network service. In the blockchain network, nodes may be divided into different types according to different functions provided by each node. For example, in an EOS (Enterprise Operation System) public chain, 21 nodes are used as verification nodes, and the rest of the nodes are ordinary nodes. In some other blockchains, each node may be used as a verification node. The verification node may be selected by competitive voting at regular intervals, and has the authority to verify transactions and add blocks to the blockchain, which may also be regarded as at least a part of a full node or a super node. In addition, the ordinary node in the blockchain network would not store book data or a copy of the complete book, but only provides general computing power support. The super node and the full node are nodes with the complete book data, which need to occupy memory to synchronize all blockchain data. These nodes are able to independently verify all the transactions on the blockchain and update data in real time, and are mainly responsible for broadcasting and verifying of transactions in the blockchain.

In addition, the blockchain may also include a storage node that stores any data written into the blockchain (for example, the storage node may also be selected from at least a part of the super nodes that can store bit-complete book data), and a usage node that acquires data from the blockchain (the usage node is an ordinary node).

As a more specific application, a data management system as shown in FIG. 3B may be used for data management in the intelligent manufacturing industry.

As mentioned above, in the intelligent manufacturing industry, the non-business data (including the usage data) of device is collected and calculated by the device provider server, and the manufacturer server pays the fees according to the calculation result of the device provider server. If data on the device provider server is modified, the fees will be different, and the manufacturer server will not be aware of this. In addition, other supply chain enterprises of the manufacturer also have the need to acquire the device usage data, so that they can stock up in time according to the usage of the device. Therefore, as shown in FIG. 3B, an intermediate device, a device provider server, an manufacturer server and a supply chain enterprise server (not shown) involved in the intelligent manufacturing industry join the blockchain as blockchain nodes, more specifically, as ordinary nodes, and the intermediate device is also communicatively connected to the device provider server. The intermediate device may be an industrial gateway between the blockchain network and the device. More generally, it may be an edge device (EDGE), which may be one or more in number, distributed near each device, with local computing, storage and networking functions, and can quickly process nearby data without returning the data to a data center and a cloud service provider. In addition, if the computing processing capacities of a plurality of devices are sufficient, the plurality of devices can directly access to the blockchain as nodes of the blockchain, without going through an intermediate device, thereby omitting the intermediate device. The present disclosure takes the case of using an intermediate device as an example for illustration, but the present disclosure is not limited to this. In an application scenario of the intelligent manufacturing industry, the device provider server may be referred to as data server node in the blockchain network, and the manufacturer server and the supply chain enterprise server (not shown) may be regarded as usage nodes.

In FIG. 3B, the plurality of devices (e.g., sensor devices) are connected to intermediate devices to report a complete data of device operation to the intermediate devices. The intermediate devices are still connected to the device provider server in a centralized architecture mode, that is, the plurality of devices report the complete data of device operation to their nearby intermediate devices, and one or more intermediate devices further report the complete data of device operation to the device provider server, and the complete data of device operation is transmitted between the device and the intermediate device and between the intermediate device and the device provider server. The device provider server, the manufacturer server, and the supply chain enterprise server (not shown) transmit information to each other in a decentralized architecture through the blockchain. The device provider server may calculate the usage of the device based on the complete data of device operation, and the device provider may charge the manufacturer based on this. The complete data of device operation is the data related to the usage of device.

In addition, if the processing capacity of the plurality of devices is sufficient, the plurality of devices may directly access to the blockchain without going through the intermediate device.

As mentioned above, it is necessary to share data among the device provider, the manufacturer and the other supply chain enterprises based on the blockchain. However, due to a huge amount of the complete data of device operation, if all the data are to be written into the blockchain for sharing, there will be a high requirement for the storage capacity at the nodes of the blockchain network.

In addition, there are a plurality of verification nodes in the blockchain, and for some types of blockchains, the number of verification nodes is relatively large. If all the verification nodes are used to verify the data to be written and/or to verify the complete data, the overall processing speed of the blockchain will be reduced and the amount of computation will be increased.

Based on this, the embodiments of the present disclosure provide a block-chain based data management method, apparatus, and system. In the embodiments of the present disclosure, digest data generated on the basis of a complete data is written into the blockchain, and the complete data is stored in a server, or further, complete digest data of the complete data or digest data generated by part of partition data of the complete data is verified merely by at least a part of verification nodes. Based on this, on the one hand, the requirement for the storage capacity of the servers of the relevant nodes on the blockchain is reduced, and the unmodifiability of the blockchain is utilized to save the complete data and enables the complete data not to be modified. On the other hand, the amount of computation and computing resources are reduced, as well as the requirement for the processing speed of the servers of the relevant nodes of the blockchain is reduced.

Figure 4A:
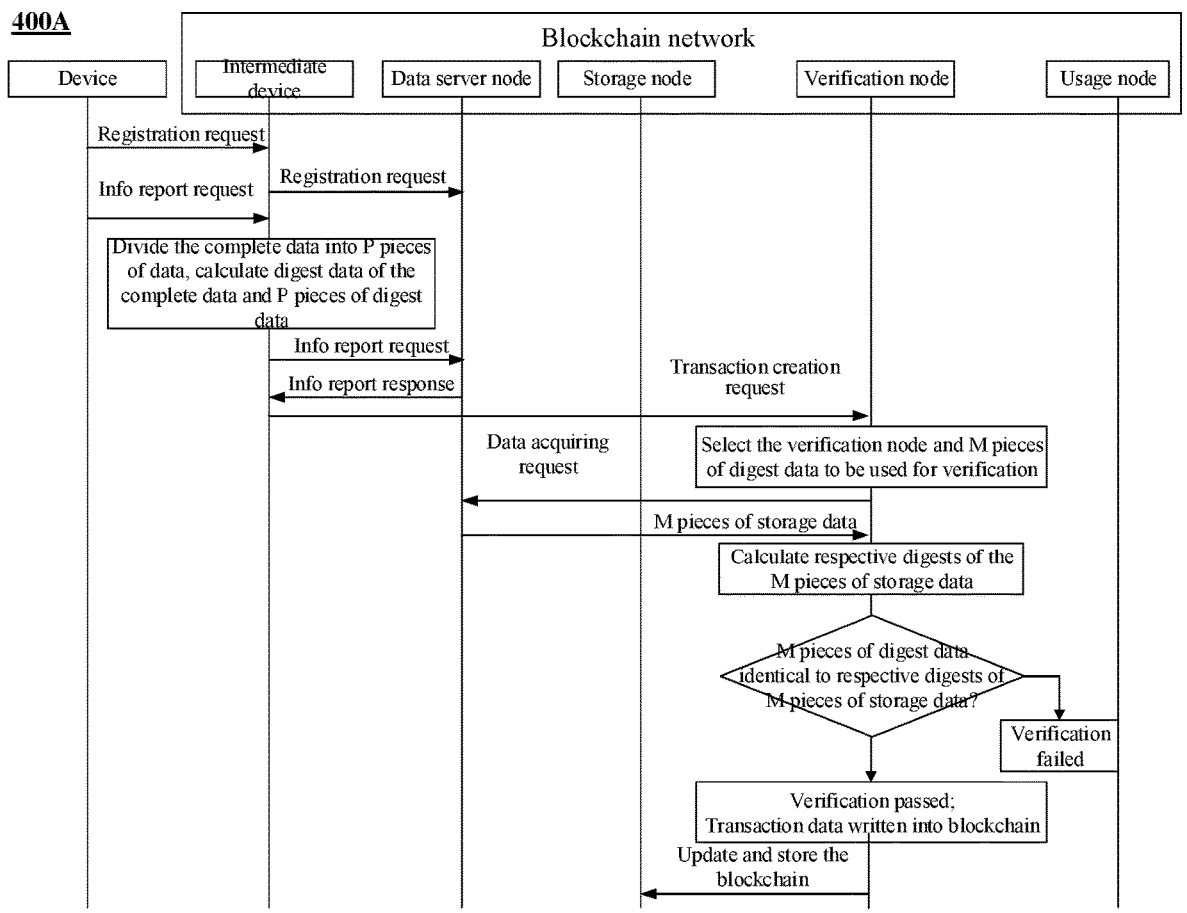
FIGS. 4A-4B show a working process of a blockchain-based data management system according to an embodiment of the present disclosure.

A blockchain-based data management system and its working process are described below with reference to FIG. 4A according to the embodiments of the present disclosure. As shown in FIG. 4A, the data management system includes at least one sensor device (hereinafter referred to as device) configured to generate a complete data; a blockchain network including a data server node configured to store data, a storage node configured to store digest data on a chain, a verification node and a usage node; and an intermediate device (as mentioned above, when the computing processing capacity of the device is sufficient, the device may be directly connected to the blockchain and the intermediate device may be omitted). In addition, the blockchain network may also include any number of other types of nodes. In addition, in some other embodiments, a data server (such as a device provider server) may not be included in the blockchain network as a node, and each node in the blockchain network may communicate with the data server to acquire data stored thereon.

Taking a specific application scenario of intelligent manufacturing as an example, the data server node may be a device provider server node, and the usage node may be a manufacturer data server node and a supply chain enterprise data server node, all of which are ordinary nodes. The verification node and the storage node may be selected from a part of super nodes in the blockchain network, and may be overlapped (only this part of the nodes on-chain store the complete book data, including all transaction data that is verified and written into the blockchain).

First, each node joins the blockchain network (not shown). For example, as mentioned above, the intermediate device, the device provider server, the manufacturer server and the supply chain enterprise server join the blockchain network as ordinary nodes, wherein the blockchain network also includes the storage node and the verification node (both the storage node and the verification node are selected from at least a part of super nodes). The device sends a registration request to the intermediate device so that the device can upload data to the intermediate device, and the intermediate device sends a registration request to the data server node so that the intermediate device can upload data to the data server node. After the device generates data, the device sends a first information report request to the intermediate device, and that first information report request may include complete data of device operation (hereinafter, may be referred to as complete data for short), and may also include device identification (ID) and/or time information. Optionally, the device identification (ID) and/or the time information is associated with the generated complete data, and is used to indicate identification and time of the device that generated the complete data.

In some embodiments, the device sends the first information report request to the intermediate device at predetermined intervals. Data reported by a single device may be regarded as a piece of a complete data. In this case, the above first information report request includes the device identification. Alternatively, a plurality of pieces of data reported by a single device in each time period may be used as one piece of a time-combined complete data. In this case, the first information report request includes the device identification and optionally includes the time information, which depends on a subsequent manner of dividing the complete data. In addition, a plurality of pieces of data reported by a plurality of devices in each time period may also be used as one piece of a device-combined complete data (for example, two pieces of device-combined complete data may be acquired by combining initial complete data of all devices in the time period from 2 p.m. to 5 p.m. and the time period from 8 p.m. to 11 p.m.). In this case, the above first information report request includes the time information and optionally includes the device identification of each device of the plurality of devices, which depends on the subsequent manner of dividing the complete data. In addition to the first information report request, a second information report request and a transaction creation request, selectively carrying the device identification and/or the time information based on similar restrictions, are described in detail below.

After the intermediate device extracts the complete data and the device identification and/or the time information from the first information report request, the following operations are performed: dividing the complete data into P pieces of data (i.e., P pieces of partition data), and generating complete digest data on the basis of the complete data and/or generating P pieces of digest data on the basis of the P pieces of data respectively, and P is an integer greater than 1; storing the complete data and/or the P pieces of data in the data server node, wherein the P pieces of data may be stored in a form of one piece of a complete data or may be stored as a plurality of pieces of storage data (2 to P pieces of storage data) in a separate form when P pieces of data need to be stored in the data server node; and when the P pieces of data are stored in the form of one piece of a complete data or are less than P pieces of storage data, when the intermediate device sends the P pieces of data to the data server node, the division information of the P pieces of data is sent to the data server node as well, so as to divide storage data at the data server node in a same manner to acquire the same P pieces of data (the complete data and/or the P pieces of data may be tampered with at the data server node, but the complete digest data and/or the P pieces of digest data are generated on the basis of the un-tampered data); and then, including the P pieces of digest data and/or N pieces of digest data of the complete digest data of the complete data in the transaction data and sending the transaction data to the verification node of the blockchain, and N is equal to P or P+1.

More specifically, the operation of storing the complete data and/or the P pieces of data in the data server node includes: sending a second information report request to the data server node, wherein the second information report request includes the complete data, the P pieces of data, and the device identification corresponding to the device generating the complete data and/or the time information corresponding to the complete data; receiving an information report response from the data server node, wherein the information report response includes at least an address of the data server node and a storage position of each of the P pieces of data in the data server node. In addition, the operation of including the N pieces of digest data in the transaction data and sending the transaction data to the verification node of the blockchain includes: sending (e.g., by packaging the transaction-related data into a block and broadcasting) a transaction creation request carrying transaction data to the verification node in the blockchain network, wherein the transaction data includes the complete digest data of the complete data and/or the N pieces of digest data in the P pieces of digest data (i.e., the N pieces of digest data are included in the transaction data, and N is equal to P or P+1, and at least a part of the complete data based on which the N pieces of data are generated and/or the P pieces of digest data are also expressed as the N pieces of data), and the transaction data may further include the position information of the N pieces of data (the position information of the data server node storing the N pieces of data and the position information of each of the N pieces of data in the data server node), the device identification corresponding to the N pieces of data, and/or the time information corresponding to the N pieces of data.

In some embodiments, the intermediate device may divide the complete data according to a preset proportion in sequence. For example, the complete data may be divided into 5 pieces of partition data in an order of 20%, 20%, 20%, 20% and 20%, or in an order of 40%, 25%, 20%, 10% and 5%, and the related information on the preset proportion in sequence may be carried with the transaction data in the transaction creation request and be notified (for example, by broadcasting) to each node in the blockchain.

In some embodiments, the intermediate device may divide one piece of a time-combined complete data (as described above) of each device according to the above-mentioned preset proportion in sequence (i.e., according to the amount of data), or may also divide the time-combined complete data according to time based on the time information. In addition, the complete data of device operation may be one piece of a device-combined complete data of the plurality of device in each time period, therefore it can also be divided according to the above-mentioned preset proportion in sequence (i.e., according to the amount of data), divided according to the device based on the device identification, or divided according to the time period based on the time information.

In some embodiments, methods of generating the summary of data may include hash operation. That is, it can include performing the hash operation on the data to acquire a hash value and using the hash value as the summary of the data, so that as long as the data changes slightly, its corresponding hash value will be completely different. Therefore, the summary of the data will be completely different. Obviously, other methods of generating the summary of data are also feasible, as long as the digest data may significantly change as the data changes slightly. In addition, in order to enhance security, an encryption process may also be introduced into the process of generating the summary of the data, which may employ an existing encryption method, so it will not be described in details here.

Table 1 provides a schematic description of a data-processing procedure related to the intermediate device when a piece of a complete data is divided into two pieces of data. It mainly includes: dividing the received complete data into a first data and a second data; generating a complete digest data of the complete data, a first digest data corresponding to the first data and a second digest data corresponding to the second data; and sending a transaction data including at least part of the complete digest data of the completer data, the first digest data and the second digest data to the blockchain network (as shown in the following cases 1-4). In addition, the complete data and/or the divided first data and second data are also sent to the data server node, and as mentioned above, the complete data, the first data and the second data may be tampered with at the data server node, so that they may no longer be the same as the complete data, the first data and the second data which were previously used as the basis of the calculation at the intermediate device.

| Method of Dividing A Complete Data | Two Copies of Data with Equal Length (50%, 50%) | Two Copies of Data with Different Length (e.g., 85%, 15%) |
|---|---|---|
| The Complete data | ABCDEFGHIJK LMNOPQRST | ABCDEFGHIJK LMNOPQRST |
| First Data | ABCDEFGHIJ | ABCDEFGHI JKLMNOPQ |
| Second Data | KLMNOPQRST | RST |
| Complete Digest data of the Complete Data | xxxxx | xxxxx |
| First Digest data | aaaaa | bbbbb |
| Second Digest data | ccccc | ddddd |
| Transaction Data (Case 1) | xxxxx; aaaaa; | xxxxx; bbbbb; |
| Transaction Data (Case 2) | xxxxx; ccccc; | xxxxx; ddddd; |
| Transaction Data (Case 3) | xxxxx; aaaaa; ccccc | xxxxx; bbbbb; ddddd |
| Transaction Data (Case 4) | aaaaa; ccccc | bbbbb; ddddd |

After the verification node extracts the transaction data from the transaction creation request, the verification node selects M pieces of digest data to be used for verification from the N pieces of digest data included in the transaction data, wherein M is an integer less than N and greater than or equal to 1 (for example, based on the division information in a preset proportion in sequence received from the intermediate device; for example, two pieces of digest data corresponding to the 4th and the 5th piece of partition data are selected). As mentioned above, the intermediate device generates a plurality of pieces of digest data on the basis of the complete data and the P pieces of data acquired by dividing the complete data, and includes the N pieces of digest data in the plurality of pieces of digest data in the transaction data to be received by the verification node. The N pieces of data based on which the N pieces of digest data are generated are expressed to be associated with the transaction data. The verification node then acquires M pieces of storage data respectively corresponding to the M pieces of digest data, calculates respective digests of the M pieces of storage data, and when each of the M pieces of digest data is identical to the respective digests of the M pieces of storage data, writes the transaction data into the blockchain. More specifically, based on the position information of the M pieces of data that generate the M pieces of digest data, a data acquiring request including the position information is sent to a data server node, the M pieces of storage data are acquired from the data server node that stores M pieces of storage data (the location of the M pieces of storage data is identical to that of the M pieces of data, and if the data is not tampered with, the M pieces of storage data are identical to the M pieces of data, so herein, the M/P pieces of storage data may sometimes be interchangeable with the M/P pieces of data) corresponding to the M pieces of digest data, and the digests of the M pieces of storage data are calculated in a same way as the intermediate device, and when each of the M pieces of digest data is identical to the respective digests of the M pieces of storage data, it is determined that the verification is passed, and the transaction data is written into the blockchain.

In some embodiments, the N pieces of data include one piece of a complete data and N−1 pieces of partition data of the complete data, and M pieces of data based on which M pieces of digest data are generated include one piece of a complete data and M−1 pieces of partition data of the complete data, or the M pieces of data are M pieces of partition data of the complete data. Alternatively, the N pieces of data are N pieces of partition data of one piece of a complete data and the M pieces of data are M pieces of partition data of the complete data.

When the M pieces of data include the M pieces of partition data of the complete data or the M−1 pieces of partition data, the verification node merely needs to acquire the partition data, but does not need to acquire the complete data, and the data volume acquired by the verification node is small, thereby reducing a network bandwidth between the verification node and the data server, and also reducing workload of the verification node and the data server and the amount of computation thereof.

In addition, as described above, lengths of the P pieces of data divided by the intermediate device from the complete data may be different. Therefore, in order to further reduce the amount of computation and save the computing resources, a shortest digest data in the N pieces of digest data may be used as the M pieces of digest data for verification. The verification process is similar to the previously described process of using the M pieces of digest data for verification, and will not be described in details here.

The verification node usually includes several the verification nodes, and transaction content is received when most verification nodes pass the verification. For example, it is stipulated in a grapefruit blockchain system that the transaction content is written into the blockchain if ⅔ of the verification nodes pass the verification. For Bitcoin blockchain network, all full-function nodes can participate in verification, but due to the wide distribution of full-function nodes, it is impossible that the verification nodes in the whole network pass the verification in a short time, hence as long as a certain proportion of the verification nodes pass the verification is enough. A ratio of the verification nodes passing the verification is set by the blockchain system, and an administrator may set that ratio to adjust the verification speed.

Therefore, in another embodiment, the verification may also be performed in the following manner.

First, a plurality of verification nodes all acquires transaction data, wherein the transaction data includes N pieces of digest data, and the N pieces of digest data are respectively generated on the basis of N pieces of data associated with the transaction data, and N is an integer greater than 1. This process is similar to the previously described process, and will not be described in details here. Optionally, the plurality of verification nodes may include a first type of verification node and a second type of verification node.

Then, the plurality of verification nodes selects M pieces of digest data to be used for verification from the N pieces of digest data, wherein M is an integer which is less than or equal to N and greater than or equal to 1. The digest data verified by the first type of verification node in the plurality of verification nodes includes digest data generated on the basis of a piece of data with a shortest length in M pieces of digest data that generate the M pieces of digest data. For example, two pieces of digest data are selected from the N pieces of digest data for verification, wherein the two pieces of digest data are generated on the basis of two pieces of data, and the first type of verification node verifies the digest data generated on the basis of a shorter one of the two pieces of data.

Next, the plurality of verification nodes acquire M pieces of stored data respectively corresponding to the M pieces of digest data, then calculate respective digests of the M pieces of stored data, and when the M pieces of digest data are identical to the respective digests of the M pieces of storage data, respectively, write the transaction data into the blockchain.

The above-mentioned way of acquiring storage data and calculating the digests of storage data are similar to that described previously, and will not be described in details here.

In addition, the M pieces of data may include one piece of a complete data and M−1 pieces of partition data of the complete data, hence the second type of verification node in the plurality of nodes verifies the digest data generated on the basis of the complete data. Alternatively, the M pieces of data include M pieces of partition data of one piece of a complete data, and the second type of verification node in the plurality of nodes verifies the digest data which is not verified by the first type of verification node.

Optionally, the amount of the first type of verification node is greater than the amount of the second type of verification node.

That is, only a part of the verification nodes may be used to verify the digest data generated by the partition data of the complete data, while another part of the verification nodes may be used to verify the complete digest data, and the amount of the former is larger. For example, 80% of the verification nodes are used to verify the digest data generated by the partition data, and 20% of the verification nodes are used to verify the complete digest data. For example, 80% of the verification nodes are used to verify the digest data generated by the shortest partition data, and 20% of the verification nodes are used to verify the remaining M−1 pieces of digest data.

As such, it is not necessary for all the verification nodes to verify the complete data, but it is still guaranteed to verify all the M pieces of digest data that need to be verified. Thereby. the accuracy of the verification is improved, and the amount of computation is reduced, saving the computing resources and improving the processing speed.

When the usage node expects to acquire the transaction data from the blockchain and determine whether the complete data of the device has been tampered with, the following operations may be performed at the usage node.

When the storage node is a part of the super node in the blockchain network, the complete book data, i.e., all the transaction data, is stored at the super node; and when the usage node does not have the transaction data to be acquired due to the usage node does not store the complete book data or the usage node does not store any book data, the usage node needs to acquire the transaction data from the storage node (super node) to further check whether the complete data of the device has been tampered with. A corresponding schematic flowchart is shown in FIG. 4B.

The process of data acquiring may include: acquiring M pieces of digest data from N pieces of digest data included in the transaction data corresponding to a specific device and/or a time period, wherein the N pieces of digest data are respectively generated on the basis of N pieces of data associated with the transaction data, and N is an integer greater than 1, and M is an integer which is less than or equal to N and greater than or equal to 1; acquiring M pieces of storage data respectively corresponding to the M pieces of digest data; calculating respective digests of the M pieces of storage data; and when the M pieces of digest data are identical to the respective digests of the M pieces of storage data, respectively, determining complete data associated with the transaction data is not tampered with. Optionally, acquiring the transaction data from the storage node in the blockchain, and acquiring N pieces of data associated with the transaction data from the data server node storing the N pieces of data associated with the transaction data. The specific device and/or the time period are the device and/or the time period for which data is desired to be acquired.

Figure 4B:
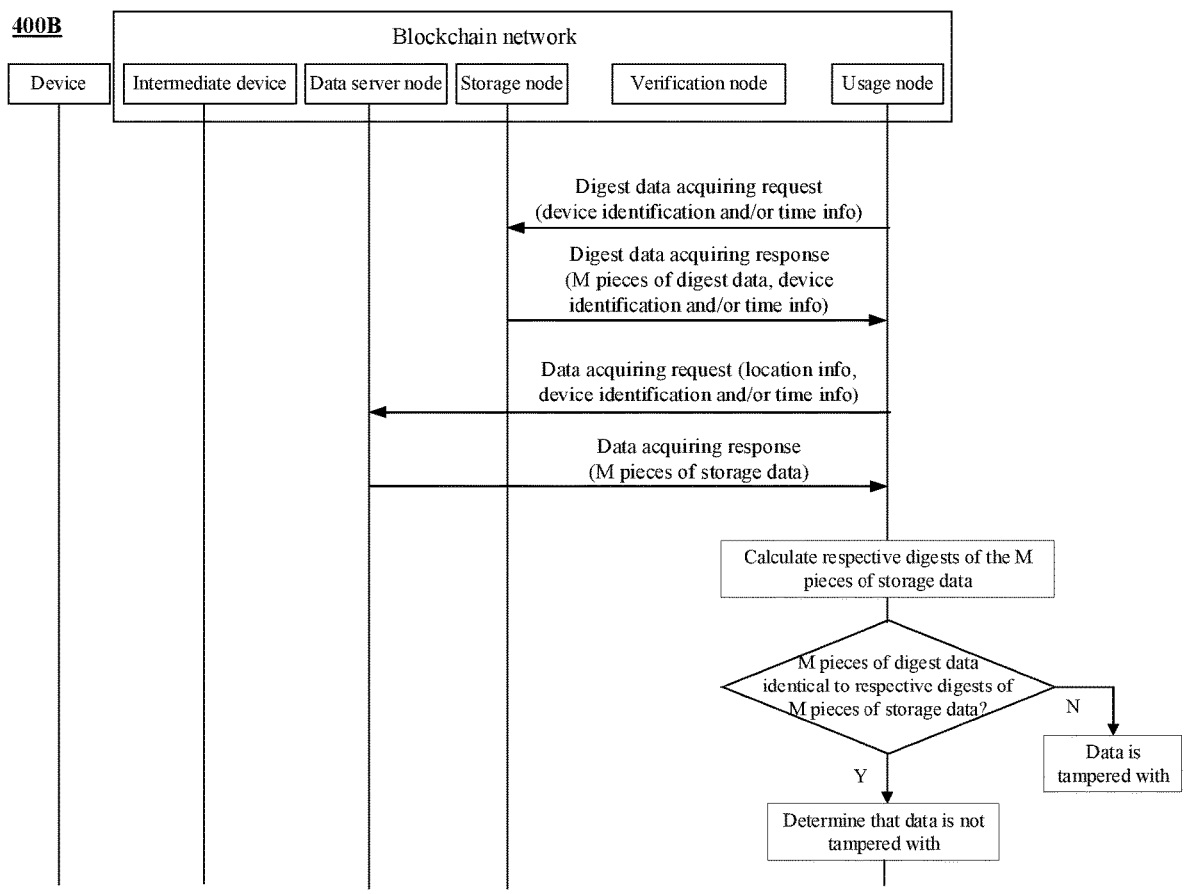

More specifically, as shown in FIG. 4B, a digest data acquiring request is sent by a usage node to a storage node (e.g., a super node) in the blockchain. The digest data acquiring request includes at least device identification and/or time information corresponding to a specific device and/or a time period. A digest data acquiring response is received from the storage node. The digest data acquiring response includes at least M pieces of digest data in the N pieces of digest data. As mentioned above, in addition to the N pieces of digest data, each piece of transaction data stored in the storage node may also include position information of the N pieces of digest data (position information of the data server node storing the N pieces of data and position information of each of the N pieces of data in the data server node), device identification corresponding to the N pieces of data, and/or time information corresponding to the N pieces of data.

In addition, the digest data acquiring response also includes an address of the data server node storing the N pieces of data and a storage position of the M pieces of storage data in the data server node, hence the usage node acquires the M pieces of storage data from the data server node based on the above information included in the data acquiring response. Then, respective digests of the M pieces of storage data are calculated, and when the M pieces of digest data are identical to the respective digests of the M pieces of storage data, respectively, it may be determined that the complete data associated with the transaction data is not tampered with.

Similar to the previous, the N pieces of data include one piece of a complete data and N−1 pieces of partition data of the complete data, and the M pieces of data based on which M pieces of digest data are generated include one piece of a complete data and M−1 pieces of partition data of the complete data, or the M pieces of data are M pieces of partition data of the complete data; Alternatively, the N pieces of data are N pieces of partition data of one piece of the complete data, and the M pieces of data are M pieces of partition data of the complete data.

When the M pieces of data include M pieces of partition data of the complete data or M−1 pieces of partition data of the complete data, the usage node merely needs to acquire the partition data, but does not need to acquire the complete data, and the data volume acquired by the usage node is small, thereby reducing a network bandwidth between the usage node and the data server, and also reducing the workload of the usage node and the data server and the amount of computation thereof.

In the blockchain-based data management system described above, the digest data generated on the basis of a complete data is written into the blockchain, and the complete data (and its P pieces of partition data) is stored off-chain in a server, or further, the complete digest data of the complete data or the digests of a part of data of the complete data is verified merely by at least a part of the verification nodes. On the one hand, the requirement for the storage capacity of the servers of the relevant nodes on the blockchain is reduced, and the unmodifiability of the blockchain is utilized to save the complete data and enables the complete data not to be modified. On the other hand, the accuracy of verification is improved, meanwhile, the amount of computation and computing resources are reduced, as well as the requirement for the processing speed of the relevant nodes of the blockchain is reduced.

Figure 5A:
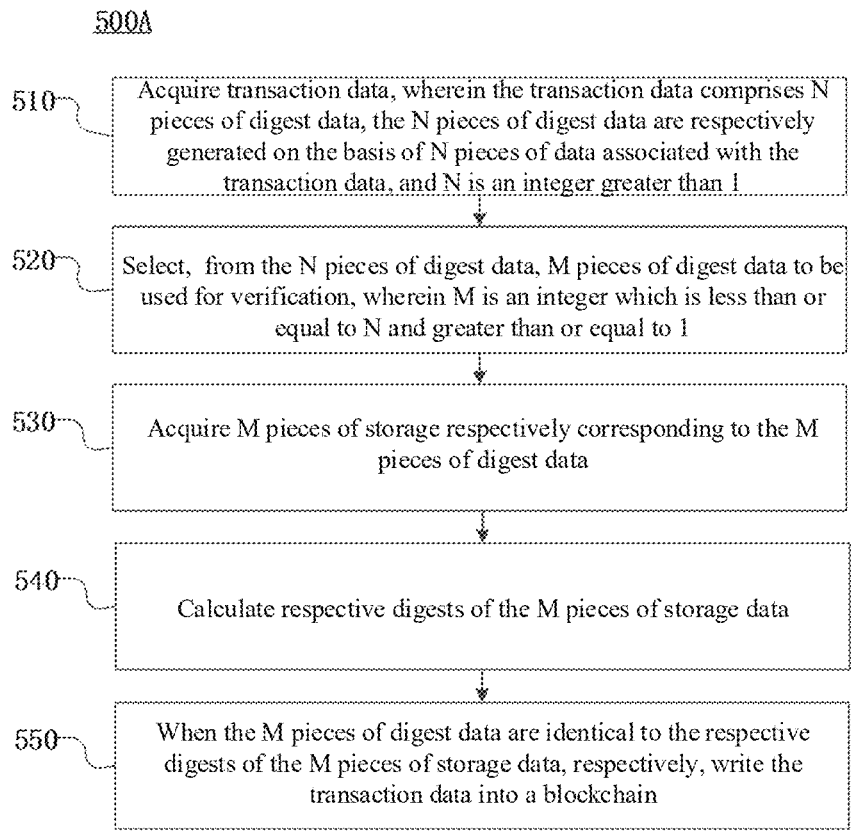
FIG. 5A shows a flowchart of a blockchain-based data management method applied to a verification node according to an embodiment of the present disclosure.
Figure 5B:
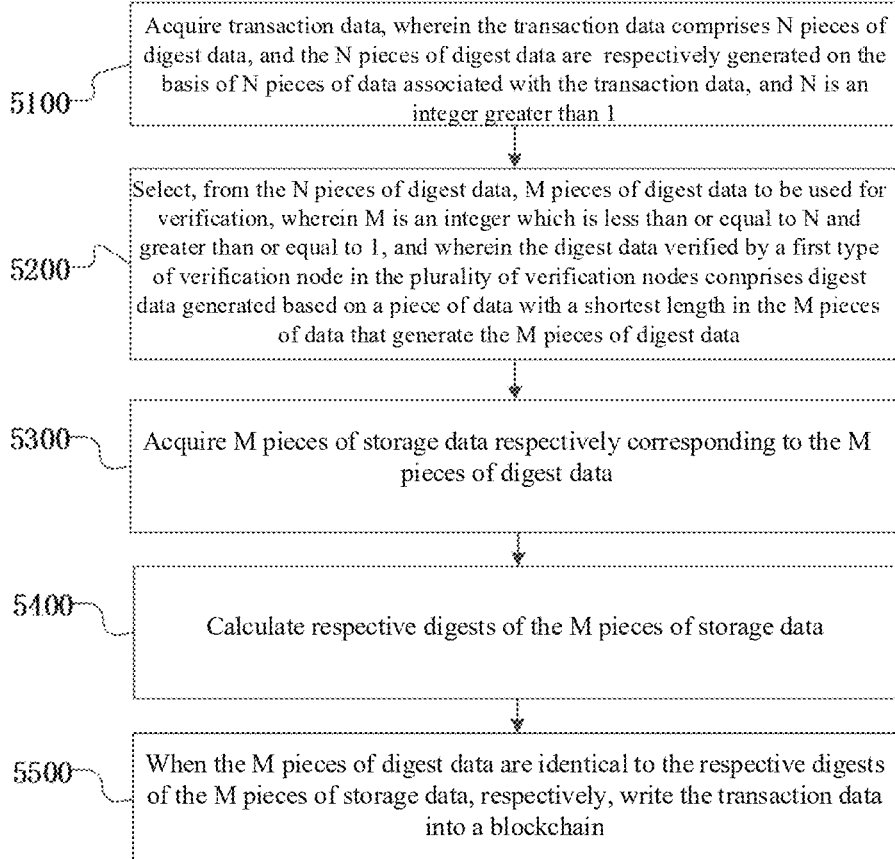
FIG. 5B shows a flowchart of another blockchain-based data management method applied to a verification node according to an embodiment of the present disclosure.

According to another aspect of the present disclosure, a blockchain-based data management method, which is applied to a verification node, is provided. FIGS. 5A-5B illustrate blockchain-based data management methods 500A and 500B according to the embodiments of the present disclosure. The methods 500A and 500B are used to verify the data to be written into the blockchain, and may be performed at at least part of the verification nodes, and include the following steps.

In the method 500A, in step 510, transaction data is acquired. The transaction data includes N pieces of digest data, and the N pieces of digest data are respectively generated on the basis of N pieces of data associated with the transaction data, and N is an integer greater than 1.

Optionally, the N pieces of data include one piece of a complete data and N−1 pieces of partition data of the complete data, or the N pieces of data are N pieces of partition data of the complete data.

Optionally, in the above specific application of the intelligent manufacturing, the N pieces of data may be acquired by dividing the data uploaded by the device as complete data.

In step 520, M pieces of digest data to be used for verification are selected from the N pieces of digest data, wherein M is an integer which is less than or equal to N and greater than or equal to 1.

In step 530, M pieces of storage data respectively corresponding to the M pieces of digest data are acquired.

Optionally, the M pieces of data include one piece of a complete data and M−1 pieces of partition data of the complete data, or the M pieces of data are M pieces of partition data of the complete data.

Optionally, at least two of the N pieces of data have different lengths, and the M pieces of digest data include digest data generated on the basis of a piece of data with a shortest length in the N pieces of data. Or, further, M=1.

Optionally, the transaction data also includes position information of the N pieces of data, and M pieces of data may be acquired respectively according to the position information of the M pieces of storage data.

Optionally, the transaction data also includes device identification corresponding to the N pieces of data, and/or time information corresponding to the N pieces of data. The position information of the N pieces of data includes position information of the data server node storing the N pieces of data and position information of each of the N pieces of data in the data server node.

In step 540, respective digests of the M pieces of storage data are calculated.

In step 550, the transaction data is written into the blockchain when the M pieces of digest data are identical to the respective digests of the M pieces of storage data, respectively.

Optionally, the transaction data is written into the blockchain when, at all the verification nodes or a part of the verification nodes (for example, more than half, such as 80%), the M pieces of digest data are determined to be identical to the digests of the M pieces of data used for verification in the N pieces of data.

In addition, when a plurality of verification nodes are to verify the data to be written into the blockchain, the operations employed are as described for each step of the method 500B.

In step 5100, transaction data is acquired. The transaction data includes N pieces of digest data, and the N pieces of digest data are respectively generated on the basis of N pieces of data associated with the transaction data, and N is an integer greater than 1.

In step 5200, M pieces of digest data to be used for verification are selected from the N pieces of digest data, wherein M is an integer which is less than or equal to N and greater than or equal to 1. The digest data verified by a first type of verification node in the plurality of verification nodes includes digest data generated on the basis of a piece of data with a shortest length in the M pieces of data that generate the M pieces of digest data.

Optionally, the M pieces of data include one piece of a complete data and M−1 pieces of partition data of the complete data, and a second type of verification node in the plurality of nodes verifies the digest data generated on the basis of the complete data. Alternatively, the M pieces of data includes M pieces of partition data of one piece of a complete data, and the second type of verification node in the plurality of nodes verifies the digest data which is not verified by the first type of verification node.

Optionally, the amount of the first type of verification node is greater than the amount of the second type of verification node.

In step 5300, M pieces of storage data respectively corresponding to the M pieces of digest data are acquired.

In step 5400, respective digests of the M pieces of storage data are calculated.

In step 5500, the transaction data is written into the blockchain when the M pieces of digest data are identical to the respective digests of the M pieces of storage data, respectively. In the method 500B, steps of acquiring the digest data, acquiring storage data, and calculating the digests are similar to those described before, so they will not be described in detail here.

Figure 6:
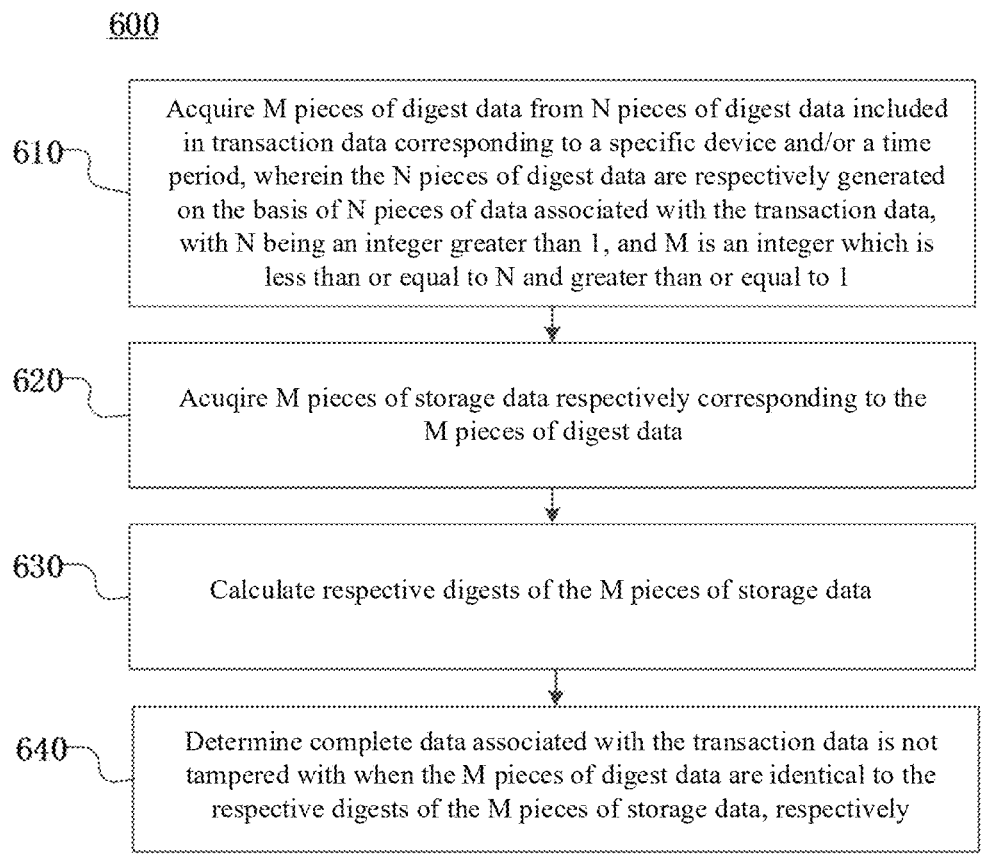
FIG. 6 shows a flowchart of a blockchain-based data management method applied to a usage node according to an embodiment of the present disclosure.

According to another aspect of the present disclosure, a blockchain-based data management method, which is applied to a usage node, is provided. FIG. 6 illustrates a blockchain-based data management method 600 according to an embodiment of the present disclosure. The method 600 is used for acquiring data from the blockchain, and includes the following steps.

In step S610, M pieces of digest data from N pieces of digest data included in transaction data corresponding to a specific device and/or a time period is acquired. The N pieces of digest data are respectively generated on the basis of N pieces of data associated with the transaction data, and N is an integer greater than 1, and M is an integer which is less than or equal to N and greater than or equal to 1.

Optionally, the N pieces of data include one piece of a complete data and N−1 pieces of partition data of the complete data, or the N pieces of data are N pieces of partition data of the complete data. M pieces of data include one piece of a complete data and M−1 pieces of partition data of the complete data, or the M pieces of data are M pieces of partition data of the complete data.

Optionally, at least two of the N pieces of data have different lengths, and the M pieces of digest data include digest data generated on the basis of a piece of data with a shortest length in the N pieces of data. Or, further, M=1.

Optionally, the operation of acquiring the M pieces of digest data may include: sending a digest data acquiring request by a usage node to a storage node in a blockchain. The digest data acquiring request includes at least device identification and/or time information corresponding to a specific device and/or a time period. Receiving a digest data acquiring response from the storage node. The data acquiring response may include M pieces of digest data in the N pieces of digest data, and may further include an address of the data server node storing the N pieces of data and a storage position of the M pieces of storage data in the data server node.

In step 620, M pieces of storage data respectively corresponding to the M pieces of digest data is acquired.

Optionally, the operation of acquiring the M pieces of storage data may include: acquiring the M pieces of storage data from the data server node based on the address of the data server node and the storage position of the M pieces of storage data in the data server node.

In step 630, respective digests of the M pieces of storage data are calculated.

In step 640, when the M pieces of digest data are identical to the respective digests of the M pieces of storage data, respectively, it is determined that the complete data associated with the transaction data is not tampered with.

Figure 7:
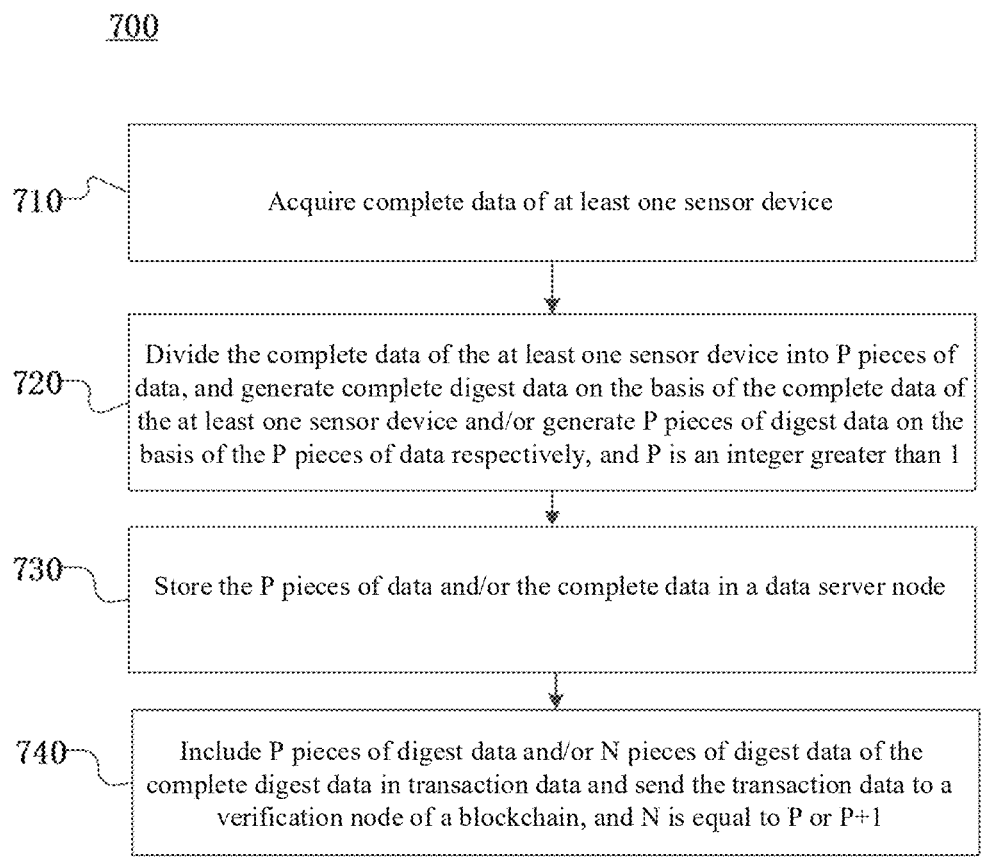
FIG. 7 shows a flowchart of a blockchain-based data management method applied to an intermediate device according to an embodiment of the present disclosure.

According to another aspect of the present disclosure, a blockchain-based data management method, which is applied to a usage node, is provided. FIG. 7 illustrates a blockchain-based data management method 700 according to an embodiment of the present disclosure. The method 700 is used for acquiring data from the blockchain, and includes the following steps.

In step 710, complete data of at least one sensor device is acquired.

Optionally, the data uploaded by the at least one sensor device further includes device identification and/or time information in addition to the complete data.

In step 720, the complete data of the at least one sensor device is divided into P pieces of data, and complete digest data is generated on the basis of the complete data of the at least one sensor device and/or P pieces of digest data are generated on the basis of the P pieces of data, respectively, and P is an integer greater than 1.

Optionally, the complete data uploaded by a single sensor device may be taken as a piece of a complete data; a plurality of pieces of data uploaded by a single sensor device in each time period may be combined as one piece of time-combined complete data; or a plurality of pieces of initial complete data uploaded by a plurality of sensor devices in each time period may be combined as one piece of device-combined complete data.

Optionally, the operation of dividing the complete data of the at least one sensor device into the P pieces of data may include: dividing the complete data, the time-combined complete data or the device-combined complete data according to a preset proportion in sequence, or dividing the time-combined complete data according to time based on the time information, or dividing the device-combined complete data in units of sensor devices based on the device identification or in units of time periods base on the time information.

In step 730, the P pieces of data and/or the complete data are stored in a data server node.

Optionally, in step S730, an information report request is sent to the data server node, and an information report response is received from the data server node. The information report request includes at least the complete data and/or the P pieces of data, as well as the device identification corresponding to the device configured to generate the P pieces of data and/or the time information corresponding to the P pieces of data. The information report response includes at least an address of the data server node and a storage position of each of the P pieces of data (that is, P pieces of storage data) in the data server node.

In step 740, P pieces of digest data and/or N pieces of digest data of the complete digest data of the complete data are included in transaction data and are sent to the verification node of the blockchain, and N is equal to P or P+1. Wherein, the verification node in the blockchain generates a block of the transaction data and writes the block into the blockchain when M pieces of digest data in the N pieces of digest data calculated by the intermediate device are identical to respective digests of M pieces of storage data corresponding to the M pieces of digest data calculated by the verification node, wherein M is an integer less than N and greater than or equal to 1.

Optionally, the M pieces of data are the complete data and M−1 pieces of partition data of the complete data; or the M pieces of data are M pieces of partition data of the complete data.

Optionally, at least two of the P pieces of data have different lengths, and the M pieces of digest data include digest data generated on the basis of a piece of data with a shortest length in the P pieces of data. Optionally, M is equal to 1.

Optionally, position information of the P pieces of storage data, device identification corresponding to the P pieces of data, and/or time information corresponding to the P pieces of data, together with the digests of the complete data and/or the N pieces of digest data, are included in the transaction data, and are sent to all or part of the verification nodes (for example, more than half, such as 80%, of the verification nodes) of the blockchain.

In the blockchain-based data management method described above, the digest data generated on the basis of a complete data is written into the blockchain, and the complete data (and its P pieces of partition data) is stored in a server, or further, the complete digest data of the complete data or the digests of a part of data of the complete data is verified merely by at least a part of the verification nodes. On the one hand, the requirement for the storage capacity of the servers of the relevant nodes on the blockchain is reduced, and the unmodifiability of the blockchain is utilized to save the complete data and enables the complete data not to be modified. On the other hand, the accuracy of verification is improved, and meanwhile, the amount of computation and computing resources are reduced, as well as the requirement for the processing speed of the servers of the relevant nodes of the blockchain is reduced.

According to yet another aspect of the present disclosure, a blockchain-based data management apparatus is also provided.

Figure 8:
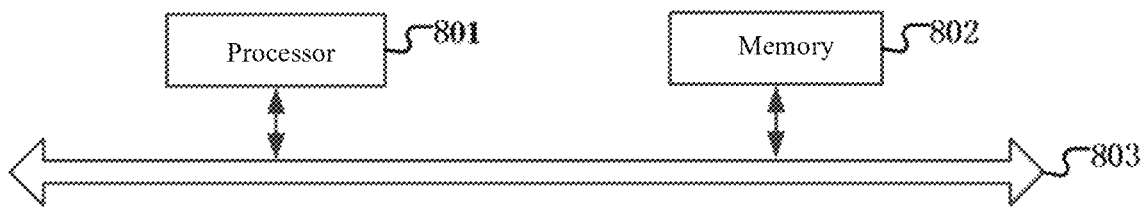
FIG. 8 shows a block diagram of a structure of a blockchain-based data management apparatus applied to a verification node according to an embodiment of the present disclosure.

FIG. 8 shows a blockchain-based data management apparatus 800, which is applied to a verification node, according to an embodiment of the present disclosure. The apparatus 800 may include a processor 801 and a memory 802. The processor 801 and the memory 802 may be connected via a bus 803.

The processor 801 may perform various actions and processes according to the instructions stored on the memory 802. When the instructions in the memory are executed, the processor may be caused to perform the steps of the blockchain-based data management method for the verification node, which described with reference to FIGS. 5A-5B, in the embodiments of the present disclosure.

Specifically, the processor 801 may be an integrated circuit chip with signal processing capability. The above processor may be a general-purpose processor, a digital signal processor (DSP), an application specific integrated circuit (ASIC), a field programmable gate array (FPGA) or other programmable logic devices, discrete gate or transistor logic devices, and discrete hardware components. The general-purpose processor may be a microprocessor, or the processor may also be any conventional processor, etc., and may be of the X87 architecture or the ARM architecture.

The memory 802 may be a volatile memory or a non-volatile memory, or may include both a volatile and a nonvolatile memory. The nonvolatile memory may be a read only memory (ROM), a programmable read only memory (PROM), an erasable programmable read only memory (EPROM), an electrically erasable programmable read only memory (EEPROM) or a flash memory. The volatile memory may be a random-access memory (RAM), which is used as an external cache. By way of illustration but not limitation, many kinds of RAM are available, such as a static random-access memory (SRAM), a dynamic random access a memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM) and a direct memory bus random access memory (DR RAM). It should be noted that the memories in the methods described in the present disclosure are intended to include, but are not limited to, these and any other suitable types of memories.

Figure 9:
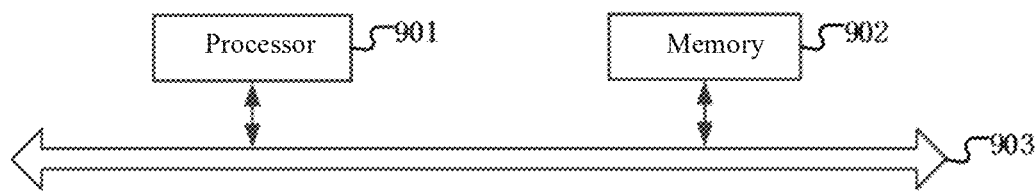
FIG. 9 shows a block diagram of the structure of a blockchain-based data management apparatus applied to a usage node according to an embodiment of the present disclosure.

FIG. 9 shows a blockchain-based data management apparatus 900, which is applied to a usage node, according to an embodiment of the present disclosure. The apparatus 900 may include a processor 901 and a memory 902. The processor 901 and the memory 902 may be connected via a bus 903.

The processor 901, the memory 802, and the bus 903 may employ a similar arrangement to that in FIG. 8. When the instructions stored on the memory 902 are executed, the processor 901 is caused to execute the steps of the blockchain-based data management method for the usage node, which is described with reference to FIG. 6, in the embodiments of the present disclosure.

Figure 10:
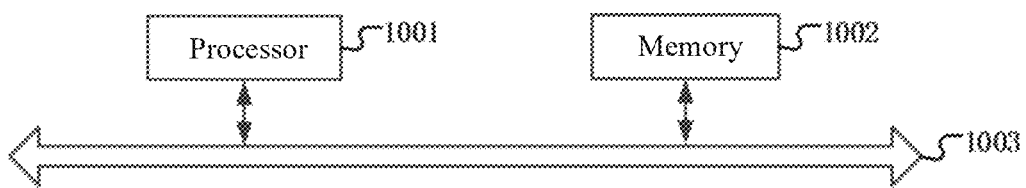
FIG. 10 shows a block diagram of a structure of a blockchain-based data management apparatus applied to an intermediate device according to an embodiment of the present disclosure.

FIG. 10 shows a blockchain-based data management apparatus 1000, which is applied to a usage node, according to an embodiment of the present disclosure. The apparatus 1000 may include a processor 1001 and a memory 1002. The processor 1001 and the memory 1002 may be connected via a bus 1003.

The processor 1001, the memory 1002, and the bus 1003 may employ a similar arrangement to that of FIG. 8. When the instructions stored on the memory 1002 are executed, the processor 1001 is caused to perform the steps of the blockchain-based data management method for the intermediate device, which is described with reference to FIG. 7, in the embodiments of the present disclosure.

In the blockchain-based data management apparatus described above, the digest data generated on the basis of a complete data is written into the blockchain, and the complete data (and its P pieces of partition data) is stored off-chain in a server, or further, the complete digest data of the complete data or the digests of a part of data of the complete data is verified merely by at least a part of the verification nodes. On the one hand, the requirement for the storage capacity of the servers of the relevant nodes on the blockchain is reduced, and the unmodifiability of the blockchain is utilized to save the complete data and enables the complete data not to be modified. On the other hand, the amount of computation and computing resources are reduced, as well as the requirement for the processing speed of the servers of the relevant nodes of the blockchain is reduced.

Although the present disclosure has been described in detail for various specific example embodiments thereof, each example is provided by way of explanation rather than limitation. Those skilled in the art can easily make alterations, changes, and equivalents to such embodiments after understanding the above disclosure. Therefore, the present disclosure does not exclude such modifications, changes and/or additions to the present disclosure that will be obvious to those of ordinary skill in the art. For example, features illustrated or described as part of one embodiment may be used with another embodiment to produce yet another embodiment. Therefore, it is intended that this disclosure cover such alterations, variations, and equivalents.

Specifically, although the figures of the present disclosure respectively describe the steps performed in a specific order for the purposes of illustration and discussion, the method of the present disclosure is not limited to the illustrated specific order or arrangement. Without departing from the scope of the present disclosure, the steps of the above methods may be omitted, rearranged, combined and/or adjusted in various ways.

Those skilled in the art can understand that all aspects of the present disclosure may be illustrated and described by several patentable categories or situations, including any new and useful processes, machines, products or combinations of substances, or any new and useful improvements thereof. Accordingly, various aspects of the present disclosure may be completely executed by hardware, software (including firmware, resident software, microcode, etc.), or a combination of hardware and software. All the above hardware or software may be referred as "block", "module", "engine", "unit", "component" or "system". In addition, aspects of the present disclosure may be represented as computer products in one or more computer-readable media, and the computer products may include computer-readable program codes.

Unless otherwise defined, all terms used in the embodiments of the present disclosure (including technical and scientific terms) have the same meanings as those commonly understood by those skilled in the art to which this disclosure belongs. It should also be understood that terms such as those defined in a general dictionary should be interpreted as having meanings consistent with their meanings in the context of related technologies, and should not be interpreted in an idealized or extremely formal sense unless otherwise explicitly defined herein.

The above is an explanation of the present disclosure and should not be taken as a limitation. Although several exemplary embodiments of the present disclosure have been described, those skilled in the art will easily understand that many modifications may be made to the exemplary embodiments without departing from the novel teaching and advantages of the present disclosure. Therefore, all these modifications are intended to be included in the scope of the present disclosure as defined by the claims. It should be understood that the above is an explanation of the present disclosure and should not be considered as limited to the specific embodiments disclosed, and modifications to the disclosed embodiments and other embodiments are intended to be included within the scope of the appended claims. The present disclosure is defined by the claims and their equivalents.

What is claimed is:

1. A blockchain-based data management method, which is applied to at least one verification node and performed by a processor thereof, the method comprising:

acquiring, from an intermediate device, transaction data, wherein the transaction data comprises N pieces of digest data, the N pieces of digest data are respectively generated at the intermediate device on the basis of N pieces of data associated with the transaction data using hash algorithm and encrypted, and wherein the N pieces of digest data are related to complete data uploaded from at least one sensor device to the intermediate device and N is an integer greater than 1;

selecting M pieces of digest data to be used for verification from the N pieces of digest data, wherein M is an integer which is less than N and greater than or equal to 1;

acquiring, from a data server node, M pieces of storage data respectively corresponding to the M pieces of digest data;

calculating, using the hash algorithm, respective digests of the M pieces of storage data; and when the M pieces of digest data are identical to the respective digests of the M pieces of storage data, respectively, writing the transaction data into the blockchain, wherein at least two of the N pieces of data have different lengths, and the M pieces of digest data comprise digest data generated on the basis of a piece of data with a shortest length in the N pieces of data, wherein the N pieces of data comprise one piece of a complete data and N−1 pieces of partition data of the complete data, and M pieces of data based on which the M pieces of digest data is generated comprise one piece of a complete data and M−1 pieces of partition data of the complete data, wherein M and N are greater than 2, or the M pieces of data comprise M pieces of partition data of the complete data; or, the N pieces of data comprise N pieces of partition data of one piece of a complete data, and the M pieces of data comprise M pieces of partition data of the complete data.

2. The method according to claim 1, wherein the transaction data further comprises position information of the N pieces of data, and the acquiring the M pieces of storage data respectively corresponding to the M pieces of digest data comprises:

acquiring, from the data server node, the M pieces of storage data respectively according to the position information of the M pieces of data based on which the M pieces of digest data is generated.

3. The method according to claim 2, wherein the position information of the N pieces of data comprises:

position information of a data server node storing the N pieces of data, and position information of each of the N pieces of data in the data server node.

4. The method according to claim 1, wherein the transaction data further comprises device identification corresponding to the N pieces of data, and/or time information corresponding to the N pieces of data.

5. The method according to claim 1, wherein the at least one verification node comprises a plurality of verification nodes, the digest data verified by a first type of verification node in the plurality of verification nodes comprises digest data generated on the basis of the piece of data with the shortest length in the M pieces of data that generate the M pieces of digest data.

6. The data management method according to claim 5, wherein the M pieces of data comprise one piece of a complete data and M−1 pieces of partition data of the complete data, and a second type of verification node in the plurality of nodes verifies the digest data generated on the basis of the complete data.

7. The data management method according to claim 6, wherein the amount of the first type of verification node is greater than the amount of the second type of verification node.

8. The data management method according to claim 5, wherein the M pieces of data comprise M pieces of partition data of one piece of a complete data, and a second type of verification node in the plurality of nodes verifies the digest data which is not verified by the first type of verification node.

9. A blockchain-based data management method, which is applied to a usage node and performed by a processor thereof, the method comprising:

acquiring, from a storage node, M pieces of digest data from N pieces of digest data included in transaction data corresponding to a specific device and/or a time period, wherein the N pieces of digest data are respectively generated on the basis of N pieces of data associated with the transaction data using hash algorithm and encrypted, and wherein the N pieces of digest data are related to complete data from at least one sensor device and N is an integer greater than 1, and M is an integer less than N and greater than or equal to 1;

acquiring, from a data server node, M pieces of storage data respectively corresponding to the M pieces of digest data;

calculating, using the hash algorithm, respective digests of the M pieces of storage data, and determining complete data associated with the transaction data is not tampered with when the M pieces of digest data are identical to the respective digests of the M pieces of storage data, respectively, wherein at least two of the N pieces of data have different lengths, and digests of the M pieces of digest data comprise digest data generated on the basis of a piece of data with a shortest length in the N pieces of data, wherein the N pieces of data comprise one piece of a complete data and N−1 pieces of partition data of the complete data, and the M pieces of data based on which the M pieces of digest data is generated comprise one piece of a complete data and M−1 pieces of partition data of the complete data, or the M pieces of data comprise M pieces of partition data of the complete data; or, the N pieces of data comprise N pieces of partition data of the complete data, and the M pieces of data comprise M pieces of partition data of the complete data.

10. A blockchain-based data management method which is applied to an intermediate device and performed by a processor thereof, the method comprising:

acquiring complete data of at least one sensor device;

dividing the complete data of the at least one sensor device into P pieces of data, generating complete digest data on the basis of the complete data of the at least one sensor device and/or generating P pieces of digest data on the basis of the P pieces of data respectively using hash algorithm, and encrypting the complete digest data and/or the P pieces of digest data, and P is an integer greater than 1;

storing the P pieces of data and/or the complete data in a data server node; and including P pieces of digest data and/or N pieces of digest data of the complete digest data in transaction data and sending the transaction data to a verification node of the blockchain, and N is equal to P or P+1, wherein the verification node in the blockchain generates a block of the transaction data and writes the block into the blockchain when M pieces of digest data in the N pieces of digest data calculated by the intermediate device using hash algorithm are identical to respective digests of M pieces of storage data corresponding to the M pieces of digest data calculated by the verification node using the hash algorithm, wherein M is an integer less than N and greater than or equal to 1, wherein at least two of the P pieces of data have different lengths, and the M pieces of digest data comprise digest data generated on the basis of a piece of data with a shortest length in the P pieces of data, wherein M pieces of data based on which the M pieces of digest data is generated comprise the complete data and M−1 pieces of partition data of the complete data, or the M pieces of data comprise M pieces of partition data of the complete data.

11. The method according to claim 10, wherein data uploaded by the at least one sensor device comprises device identification and/or time information in addition to the complete data.

12. The method according to claim 11, wherein data uploaded by a single sensor device is taken as a piece of a complete data; or a plurality of pieces of data uploaded by a single sensor device in each time period are combined as one piece of time-combined complete data; or a plurality of pieces of data uploaded by a plurality of sensor devices in each time period are combined as one piece of device-combined complete data, wherein the dividing the complete data of the at least one sensor device into P pieces of data comprises:
dividing the complete data, the time-combined complete data or the device-combined complete data according to a preset proportion in sequence, or
dividing the time-combined complete data according to time base on the time information, or
dividing the device-combined complete data in units of sensor devices based on the device identification or in units of time periods base on the time information.

13. The method according to claim 10, further comprising:
including position information of the P pieces of data, the device identification corresponding to the P pieces of data, and/or the time information corresponding to the P pieces of data, together with the complete digest data and/or the N pieces of digest data in the P pieces of digest data, in the transaction data and sending the transaction data to the verification node of the blockchain.

14. The method according to claim 13, wherein the position information of the P pieces of data comprises:
position information of the data server node storing the P pieces of data and position information of each piece of storage data in the P pieces of data in the data server node.

* * * * *